United States Patent [19]

Braun

[11] Patent Number: 4,474,083

[45] Date of Patent: Oct. 2, 1984

[54] FUEL CONTROL MODULATION

[75] Inventor: Eugene R. Braun, Royal Oak, Mich.

[73] Assignee: Eaton Corporation, Cleveland, Ohio

[21] Appl. No.: 453,541

[22] Filed: Dec. 27, 1982

[51] Int. Cl.[3] .............................................. B60K 41/04

[52] U.S. Cl. ....................................... 74/867; 123/342

[58] Field of Search ............... 123/342, 360, 376, 396; 74/857-861, 865, 867, 869; 192/0.09, 0.092

[56] References Cited

U.S. PATENT DOCUMENTS

| | | | |
|---|---|---|---|
| 2,533,180 | 12/1950 | Rhodes | 123/376 |
| 2,580,106 | 12/1951 | Long | 192/0.07 |
| 2,587,892 | 3/1952 | Price | 192/0.092 |
| 2,601,628 | 6/1952 | Price | 74/472 |
| 2,605,874 | 8/1952 | Price | 192/0.092 |
| 3,814,224 | 6/1974 | Podssuweit et al. | 74/858 |
| 4,210,110 | 7/1980 | Krebaum et al. | 123/396 |
| 4,397,276 | 8/1983 | Hayashida | 123/376 |

*Primary Examiner*—William A. Cuchlinski, Jr.

*Attorney, Agent, or Firm*—P. S. Rulon; C. H. Grace

[57] ABSTRACT

Disclosed is a throttle modulation mechanism (10) disposed between a throttle pedal (36) and a fuel control device (12) for an unshown engine. Mechanism is operable during shifting modes of an unshown transmission driven by the engine to dip and boost fuel delivery to the engine for synchronizing the transmission and/or reducing shifting shocks. Mechanism (10), which is controlled by a transmission logic (14), includes first and second levers (16, 20) interconnected for slaved movement by a torsion spring (22) and a fluid actuated cylinder (30) having pistons (48, 52) respectively operative to dip and boost the throttle in response to logic signals applied to solenoid valves (58, 66). A spring (38) connects to and biases lever 16 toward an idle throttle position for allowing movement of lever (20) relative to lever (16) by actuator (30) during shifting modes of the transmission without changing the force applied to throttle pedal (36) by spring (38).

23 Claims, 5 Drawing Figures

FUEL CONTROL MODULATION

CROSS-REFERENCE TO RELATED APPLICATIONS

This application is related to U.S. applications Ser. Nos. 453,542, 453,544, and 453,668 all filed Dec. 27, 1982 and all assigned to the assignee of this application.

BACKGROUND OF THE INVENTION

1. Field of the Invention

The present invention relates to a mechanism for automatically modulating fuel delivery to an engine. More specifically, the present invention relates to such a mechanism for synchronizing and/or reducing shifting shocks of a transmission.

2. Description of the Prior Art

It has been previously proposed to automatically modulate or vary the speed of an engine during shifting modes of a transmission in an effort to simulate what is done by an experienced driver during manual shifting. For example, U.S. Pat. No. 3,736,806 proposes increasing fuel delivery to an engine during manual shifting of a mechanical transmission; U.S. Pat. No. 3,834,499 proposes both increasing and decreasing fuel delivery to an engine during automatic shifting of a mechanical transmission; and U.S. Pat. No. 4,226,141 proposes decreasing fuel delivery to an engine during automatic shifting of a transmission to facilitate synchronization of the transmission and to reduce shifting shocks.

The prior art mechanisms for modulating engine speed during shifting modes of a transmission have had several disadvantages. Most have been on/off type mechanisms which have not provided smooth, precise changes in engine speed and torque and, therefore, have provided less than optimum synchronizing and shift shock results. Some have been incorporated directly into fuel control devices and therefore have required complex and costly redesign of the fuel control devices. Some have operated directly on throttle pedal linkages with resulting mechanical feedback or physical movement of the throttle pedal. This feedback or movement, which is noticed by the operator, is disagreeable and interferes with proper and effective control of the vehicle.

Further, with respect to optimum synchronizing and shift shock, the prior art mechanisms have not readily provided the many different precise degrees of fuel delivery change necessary during shifting modes of a transmission. For example, precisely regulated, ramped, incremental increases and decreases of fuel delivery can greatly reduce shifting shocks felt by a vehicle operator, reduce torsional oscillations in the vehicle drivetrain, reduce synchronizing time, reduce energy consumed by synchronizing devices, and reduce impulse forces on jaw clutches.

Further, with respect to mechanical feedback or physical movement of the throttle pedal, even though a modulation mechanism may not physically move the throttle pedal during throttle modulation, the mechanism may cause objectionable force changes on the throttle pedal if the spring biasing the throttle system toward idle is not properly positioned. These force changes, though not as disagreeable as physical movement of the throttle pedal, are nevertheless distracting to a vehicle operator.

SUMMARY OF THE INVENTION

An object of this invention is to provide a mechanism for controlling fuel delivery to a prime mover independent of throttle pedal position during shifting modes of a transmission driven by the prime mover.

Another object of this invention is to provide such a mechanism which minimizes physical and force changes on an operator-controlled throttle pedal during the shifting modes.

According to a feature of the invention, the mechanism of the present invention is adapted to be interposed between an engine throttle pedal and an engine fuel control device such as a throttle valve or fuel injection device. The mechanism comprises moveable means, includes a first portion adapted for movement in response to movement of the throttle pedal, a second portion adapted to be connected with the fuel control device for slaved movement therewith, and a third portion; actuator means for moving the third portion of the moveable means such that the second portion moves to vary the fuel control delivery independent of throttle pedal position during shifting modes of the transmission; and means biasing the first portion towards a minimum fuel delivery position with a force substantially unaffected by movement of the third portion by the actuator means. According to another feature of the invention, the mechanism, as adapted in the previous feature, includes first and second moveable members respectively adapted to be connected to the throttle pedal and the fuel control device for slaved movement therewith; first resilient means interconnecting the members for inphase movement in response to throttle pedal movement in response to throttle pedal movement during nonshifting modes of the transmission; actuator means for moving the second member independent of the throttle pedal position during shifting modes of the transmission; and second resilient means mechanically connected to the first member and biasing the first member towards a minimum fuel delivery position.

BRIEF DESCRIPTION OF THE DRAWINGS

The throttle modulation mechanism of the present invention is shown in the accompanying drawings in which.

Certain terminology referring to proposed environment, direction, and motion will be used in the following description. This terminology is for convenience and clarity in describing the invention and should not be considered limiting in the appended claims unless the claims are explicitly so limited.

DETAILED DESCRIPTION OF THE DRAWINGS

Figure 1:
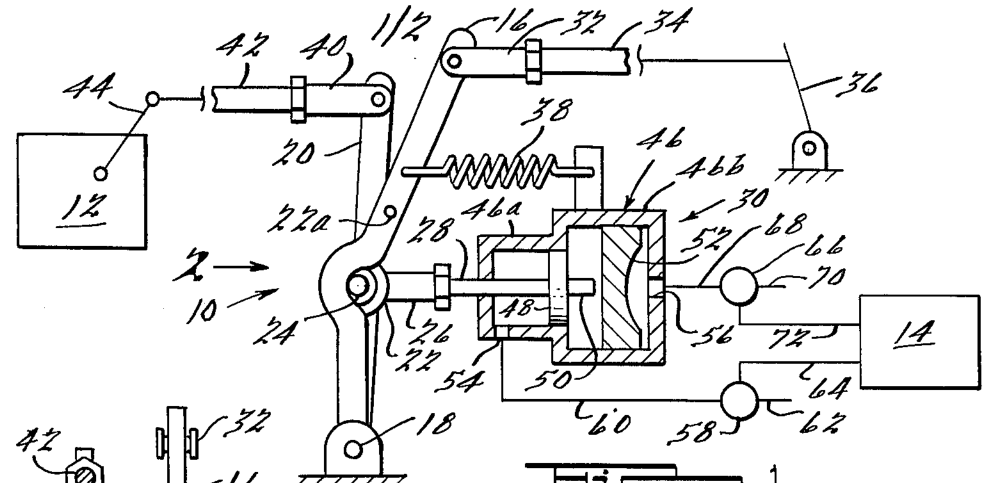
FIG. 1 schematically illustrates the modulation mechanism connected between a throttle pedal and a fuel control device with the mechanism in the idle throttle position.

FIG. 1 schematically shows a two-lever throttle modulation mechanism 10 for automatically decreasing and increasing fuel delivery from a fuel control device 12 to an unshown prime mover in response to signals from a transmission logic 14 during shifting modes of an unshown transmission driven by the prime mover. Mechanism 10 is contemplated for use in a wheeled vehicle such as a truck. The prime mover may be of any adaptable type, e.g. the prime mover may be an engine of the Otto or diesel cycle type. The transmission may also be of any multiple ratio type, e.g., a manually shifted transmission employing positive or jaw-type clutches to effect ratio changes, an automatically shifted transmission employing friction clutches to effect ratio changes, or an automatically shifted transmission employing positive clutches to effect ratio changes. Mechanism 10 is contemplated for use with this latter type of transmission, which is often referred to as an automatic mechanical transmission. Such a transmission and logic system for controlling shifting is disclosed in U.S. Pat. No. 4,361,060 which issued Nov. 30, 1982. U.S. Pat. No. 4,361,060 is incorporated herein by reference.

Figure 2:
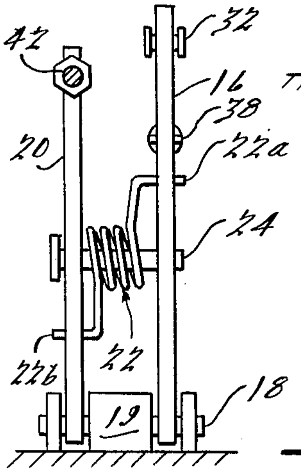
FIG. 2 is a side elevational view of the mechanism looking in the direction of arrow 2.

Looking now at FIGS. 1 and 2, mechanism 10 includes a first moveable lever or member 16 mounted at one end for rotation or oscillatory movement about the axis of a shaft 18, mounted in a grounded base 19, a second moveable lever or member 20 mounted at one end for rotation or oscillatory movement about the axis of shaft 18 and relative first lever 16, a torsion spring 22 coiled about an extension of a clevis pin or bolt 24 extending through a slotted opening in lever 20 for pivotally securing a clevis 26 to lever 20. Clevis 26 is in turn fixed to a piston rod 28 of an actuator 30. First lever 16 is pivotally connected at its other end to a clevis 32 of a linkage mechanism 34 moved in direct response to the position of an operator-controlled throttle pedal 36. A spring 38, attached at one end to lever 16 and the other end to a member fixed to actuator 30, biases first lever 16 and linkage mechanism 34 toward an idle throttle position. Second lever 20 is pivotally connected at its other end to a clevis 40 fixed to a link 42 which is in turn pivotally connected to a lever 44 for varying fuel flow or delivery to the engine in response to rotation from the idle throttle position shown in FIG. 1 to the full or wide-open throttle position shown in FIG. 3.

Actuator 30 includes a housing 46 defining a throttle dip cylinder portion 46*a* and a throttle boost cylinder portion 46*b* a dip piston 48 fixed to and integral with piston rod 28 and having a projection 50, a boost piston 52, and ports 54, 56 for entrance and exit of pressurized fluid to the left and right sides of pistons 48, 52 respectively. Housing 48 is fixed against movement relative to lever base 19. Piston 48 is moved to the right by pressurized fluid controlled by an electrically operated valve 58 connected with port 54 via a conduit 60. Valve 58 is connected to an unshown source of pressurized fluid, such as air, by a conduit 62 and is connected to logic 14 via a wire 64. Piston 52 is moved to the right by pressurized fluid controlled by an electrically operated valve 66 connected to port 56 via a conduit 68. Valve 66 is connected to the unshown source of pressurized fluid by a conduit 70 and is connected to logic 14 via a wire 72. During nonshifting modes of the transmission piston 48 and rod 28 freely move with second lever 20, whereby complete control of fuel delivery to the engine is a function of throttle pedal position due to the torsion spring interconnection of first and second levers 16, 20.

Valves 58, 66 may be of the nonpressure regulating type which vent or apply full fluid pressure to the cylinder in response to the presence or absence of electrical signals from logic 14, whereby the pistons are either fully actuated or unactivated. Further, valves 58, 66 may each be replaced by two or more valves controlled by the logic and connected to ports 54, 56 in parallel for controlling the rate of fluid flow to an from the cylinder. All of these valves and logics for controlling them are well-known, e.g., the valves may be responsive to amplitude modulated or duty cycle modulated signals from the logic.

Figure 3:
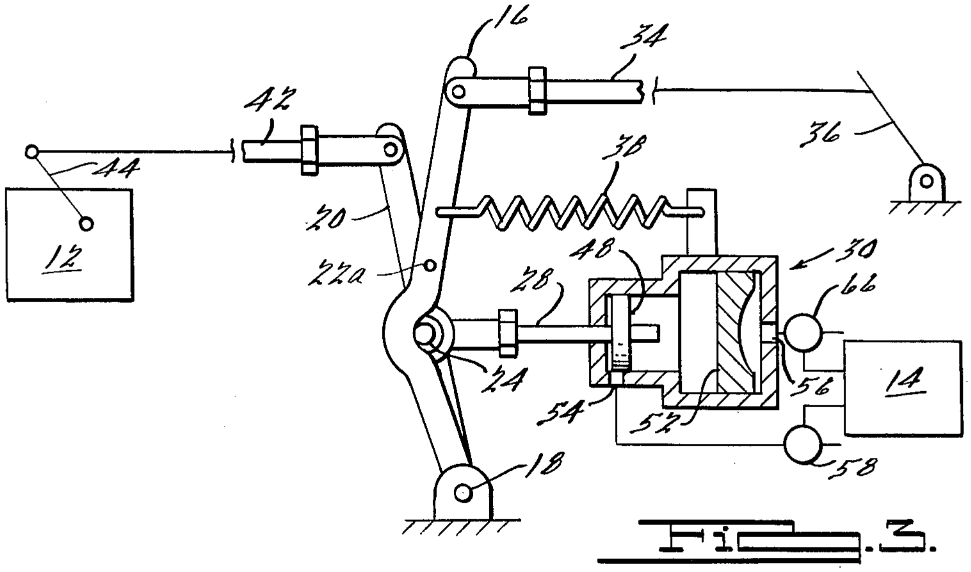
FIGS. 3-5 respectively illustrate the mechanism of FIG. 1 in a wide-open throttle position, a throttle dip position, and a throttle boost position.
Figure 4:
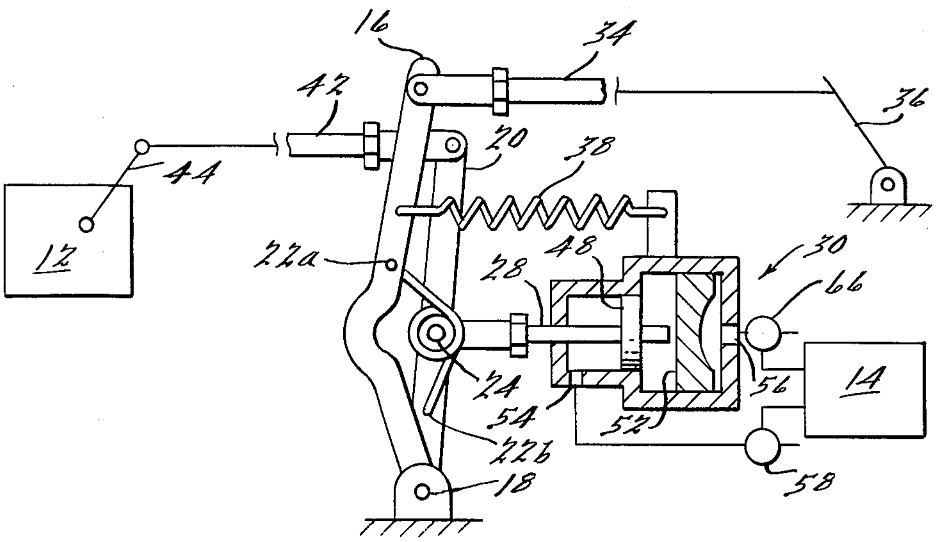
Figure 5:
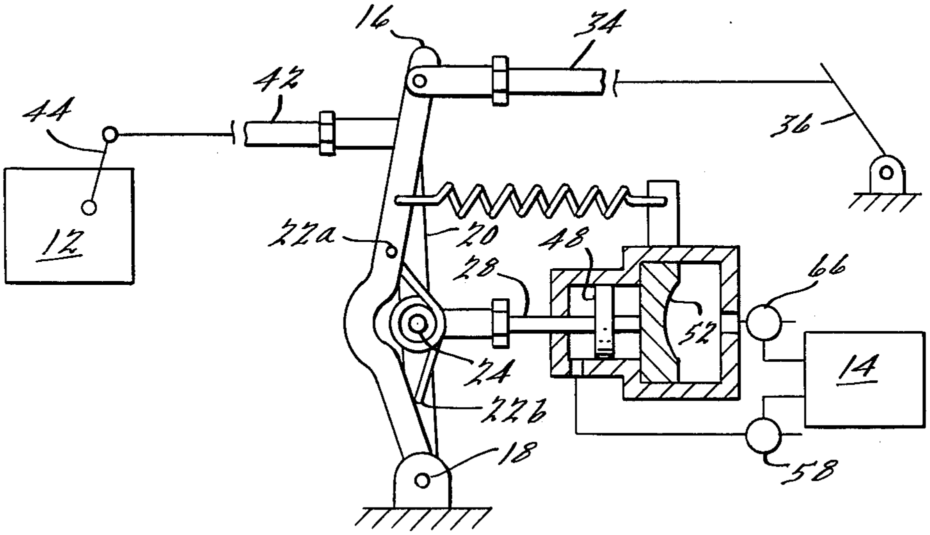

Looking now at torsion spring 22 and clevis pin 24, spring 22 is coiled about pin 24 and fixed at its opposite end 22*a* and 22*b* to levers 16, 20 with a preload force on lever 16 which biases lever 16 clockwise against pin 24. Hence, the extension of pin 24 defines a stop which limits clockwise rotation of lever 16 relative to lever 20 or limits counterclockwise rotation of lever 20 relative to lever 16. The preload of torsion spring 22 is sufficient to ensure inphase movement of the levers in response to throttle pedal movement of lever 16 during nonshifting modes of the transmission. Coil spring 38 which is positioned to bias lever 16 clockwise toward the idle throttle position, provides a preload biasing force substantially greater than the preload of torsion spring 22. Hence, movement of lever 20 by actuator 30 will be substantially unnoticed by an operator having his foot on the throttle pedal unless movement of lever 20 causes the stop defined by pin 24 to contact lever 16. In fact, when lever 16 is at the wide-open throttle position, as shown in FIGS. 3–5, resilient feedback via torsion spring 22 to lever 16 and throttle pedal 36 in response to dip and boost movements of lever 20 by actuator 30 are just enough to allow the operator to perceive or sense that the modulation device is operating.

Operation

To describe operation, it will be assumed that mechanism 10 is in a wheeled vehicle in combination with an automatic mechanical transmission having jaw-type clutches for engaging and disengaging step ratio gears in the transmission and a friction type master clutch interposed between the prime mover and the transmission. The jaw and master clutches are controlled by logic 14. Further, logic 14 maintains the master clutch disengaged when the vehicle is at rest and an unshown switch indicates that throttle pedal is in the idle position. The unshown switch may be in the form of a transducer or pot driven by lever 16 and operative to provide an electrical signal to logic 14 representative of throttle pedal position. The transmission may further include devices to assist synchronization of the jaw clutches, e.g., the jaw clutches may each include a synchronizer which effects upshift and downshift synchronization or retarder and accelerator devices which respectively effect upshift and downshift synchronizing of all of the ratios. The retarder may be a brake connected to the transmission input shaft, and the accelerator may be a clutch operative to connect the input shaft with a faster rotating member. Such retarder and accelerator devices are well-known in the art and are readily made responsive to signals from a logic. Further, size, wear, and effectiveness of all of these devices is enhanced by mechanism 10 since the amount of torque they would often have to handle is decreased by throttle modulation.

Assuming now that the transmission shift selector is in a forward drive position with the throttle pedal in the idle position and the vehicle at rest, the master clutch is therefor disengaged, and a starting ratio gear is engaged. When the throttle pedal is depressed, the master clutch is engaged at a rate determined by throttle pedal position and other known parameters. When the vehicle reaches a speed, determined by throttle pedal position and other parameters, logic 14 initiates an upshift mode; at this time the throttle pedal may be at any position between idle and wide-open throttle as shown in FIG. 3. The upshift mode may comprise several different sequences to effect the upshift. Herein is one sequence: logic 14 sends a throttle dip signal to valve 58 via wire 64 to dip the throttle or decrease fuel delivery to the engine, thereby reducing engine torque in the vehicle drivetrain and suspension system at a controlled rate prior to disengagement of the master clutch. Concurrent or substantially concurrent with the throttle dip signal, logic 14 initiates disengagement of the then-engaged jaw clutch, which will not normally move to the disengaged position until the driveline torque across the jaws diminishes. The logic then initiates disengagement of the master clutch if the transmission includes a retarder, such as a brake, to reduce input shaft speed for synchronizing the jaw clutch to be engaged for the next upshift ratio. As synchronization is reached, the logic initiates engagement of the jaw clutch, then reengagement of the master clutch at a controlled rate, and then throttle boost by venting port 54 and/or pressurizing port 56 to control the rate of engine speed and torque rise commensurate with a smooth shift. Further upshifts are substantially the same.

Downshifts differ principally in that they require an increase in input shaft speed to effect synchronization. When logic 14 senses the need for a downshift, a throttle dip signal is sent to valve 58 via wire 64 as during an upshift. Concurrent or substantially concurrent with the throttle dip signal, logic 14 initiates disengagement of the then-engaged jaw clutch which will not normally move to the disengaged position until the driveline torque across the jaws diminishes. The logic then initiates disengagement of the master clutch. If the transmission includes an accelerator device, as previously mentioned, the device increases the input shaft speed to synchronize the jaw clutch to be engaged, while the master clutch remains disengaged; as synchronization is reached, the logic initiates engagement of the jaw clutch and then engagement of the master clutch. If the transmission does not include such a device, logic 14 initates engagement of the master clutch and then throttle boost to effect synchronization by sending a boost signal to valve 66, then disengagement of the master clutch as synchronization is reached to allow engagement of the jaw clutch, and then reengagement of the master clutch at a controlled rate. This engagement, disengagement, and reengagement of the master clutch during the downshift sequence is the well-known double clutch procedure long practiced by operators of manually shifted transmissions.

One embodiment of the invention has been disclosed for illustrative purposes. Many variations and modifications of the disclosed embodiment are believed to be within the spirit of the invention. To mention but a few of such variations, torsion spring 22 could be replaced by some other type of device such as a lost motion device which will allow slaved movement of levers 16, 20 during nonshifting modes of the transmission and relative movement of the levers during shifting modes of the transmission. The following claims are intended to cover the inventive portions of the invention and variations and modifications within the spirit of the disclosed invention.

What is claimed is:

1. A mechanism adapted to be interposed between an engine throttle pedal and an engine fuel control device for varying fuel delivery to an engine during shifting modes of a transmission driven by the engine, the mechanism comprising:

first and second members mounted for relative movement, said first member adapted to be connected with the throttle pedal for slaved movement therewith, and said second member adapted to be connected with the fuel control device for slaved movement therewith;

actuator means for moving said second member to vary the fuel control delivery independent of throttle pedal position during shifting modes of the transmission;

first resilient means interconnecting said first and second members for inphase movement in response to movement of the first member during nonshifting modes of the transmission; and second resilient means biasing the first member towards a reduced fuel delivery position with a force greater than the biasing force of said first resilient means whereby movement of said second member by said actuator means is independent of throttle pedal position and with little force feedback to said throttle pedal.

2. The mechanism of claim 1, wherein said first and second members respectively define first and second levers mounted for relative pivotal movement.

3. The mechanism of claim 2, wherein said first resilient means comprises a torsion spring.

4. The mechanism of claim 2, wherein said levers are mounted for pivotal movement about a common axis and said first resilient means comprises a torsion spring.

5. The mechanism of claim 2, further including stop means for limiting pivotal movement of one of said levers relative to the other lever and wherein said first resilient means biases said one lever toward said stop means.

6. A mechanism adapted to be interposed between an engine throttle pedal and an engine fuel control device for varying fuel delivery to an engine during shifting modes of a transmission driven by the engine, the mechanism comprising:

moveable means including a first portion adapted for movement in response to movement of the throttle pedal, a second portion adapted to be connected with the fuel control device for slaved movement therewith, and third portion;

actuator means for moving said third portion of the moveable means such that the second portion moves to vary the fuel control delivery independent of throttle pedal position during shifting modes of the transmission; said actuator means including a cylinder having first and second ports, a piston rod having one end disposed in said cylinder and the other end secured to said third portion for slaved movement therewith, and first and second pistons slidably disposed in said cylinder; said first piston operative to move said piston rod and said second portion to a reduced fuel delivery position in response to pressurized fluid at said first port and said second piston operative to move said piston rod and said second portion to an increased fuel delivery position in response to pressurized fluid at said second port; and means biasing the first portion towards a reduced fuel delivery position with a force substantially uneffected by movement of the third portion by the actuator means.

7. The mechanism of claim 6, wherein said moveable means includes first and second members mounted for relative movement, said first member having said biasing means mechanically connected thereto and defining said first portion, and said second member defining said second and third portions; and further including means interconnecting said members for inphase movement in response to movement of the first member during nonshifting modes of the transmission.

8. The mechanism of claim 7, wherein said means interconnecting comprises a resilient means.

9. The mechanism of claim 6, wherein said moveable means includes first and second levers mounted for relative pivotal movement, said first lever having said biasing means mechanically connected thereto and defining said first portion, and said second member defining said second and third portions; and further including means interconnecting said levers for inphase movement in response to movement of the first lever during nonshifting modes of the transmission.

10. The mechanism of claim 9, wherein said means interconnecting comprises a resilient means.

11. The mechanism of claim 9, wherein said levers are mounted for pivotal movement about a common axis and said means interconnecting comprises a torsion spring.

12. The mechanism of claim 9, further including stop means for limiting pivotal movement of one of said levers relative to the other lever and wherein said biasing means biases said one lever toward said stop means.

13. The mechanism of claim 6, wherein said second piston is operative to move said piston rod and said second portion to said increased fuel delivery position independent of the presence or absence of pressurized fluid at said first port.

14. The mechanism of claim 6, wherein said moveable means includes first and second levers each mounted at one end for relative pivotal movement about a common axis, said first lever having its other end defining said first portion, and said second lever having its other end defining said second portion and having a part between said ends defining said third portion; and further including a torsion spring interconnecting said levers for inphase movement in response to movement of the first lever by the throttle pedal.

15. In a vehicle having ground-engaging wheels driven by a multiple, step ratio transmission connected to a combustion engine; an operator-controlled throttle pedal for varying fuel delivery to the engine by a fuel control device; and an improved mechanism for varying the fuel delivery independent of the throttle pedal position during shifting modes of the transmission; the improved mechanism comprising:

moveable means including a first portion moveable between fuel flow increasing and decreasing directions in response to movement of the throttle pedal, a second portion connected for slaved movement with the fuel control device, and a third portion;

actuator means for moving said third portion of the moveable means such that the second portion moves to vary the fuel delivery independent of throttle pedal position during shifting modes of the transmission; said actuator means including a cylinder having first and second ports, a piston rod having one end disposed in said cylinder and the other end secured to said third portion for slaved movement therewith, and first and second pistons slidably disposed in said cylinder; said first piston operative to move said piston rod and said second portion to a reduced fuel delivery position in response to pressurized fluid at said first port and said second piston operative to move said piston rod and said second porion to an increased fuel delivery position in response to pressurized fluid at said second port; and means mechanically connected to and biasing the first portion towards a reduced fuel delivery position with a force substantially uneffected by movement of said third portion by said actuator means.

16. The improved mechanism of claim 15, wherein said moveable means includes first and second members mounted for relative movement, said first member having said biasing means mechanically connected thereto and defining said first portion, and said second member defining said second and third portions; and further including means interconnecting said members for inphase movement in response to movement of the first member by the throttle pedal.

17. The mechanism of claim 16, wherein said means interconnecting comprises a resilient means.

18. The mechanism of claim 15, wherein said moveable means includes first and second levers mounted for relative pivotal movement, said first lever having said biasing means mechanically connected thereto and defining said first portion, and said second member defining said second and third portions; and further including means interconnecting said levers for inphase movement in response to movement of the first lever by the throttle pedal.

19. The mechanism of claim 18, wherein said means interconnecting comprises a resilient means.

20. The mechanism of claim 18, wherein said levers are mounted for pivotal movement about a common axis and said means interconnecting comprises a torsion spring.

21. The mechanism of claim 18, further including stop means for limiting pivotal movement of one of said levers relative to the other lever and wherein said biasing means biases said one lever toward said stop means.

22. The mechanism of claim 15, wherein said second piston is operative to move said piston rod and said second portion to said increased fuel delivery position independent of the presence or absence of pressurized fluid at said first port.

23. The mechanism of claim 15, wherein said moveable means includes first and second levers each mounted at one end for relative pivotal movement about a common axis, said first lever having its other end defining said first portion, and said second lever having its other end defining said second portion and having a part between said ends defining said third portion; and further including a torsion spring interconnecting said levers for inphase movement in response to movement of the first lever by the throttle pedal.

* * * * *